D. R. PRATT.
Car Truck.
No. 30,421. Patented Oct. 16, 1860.
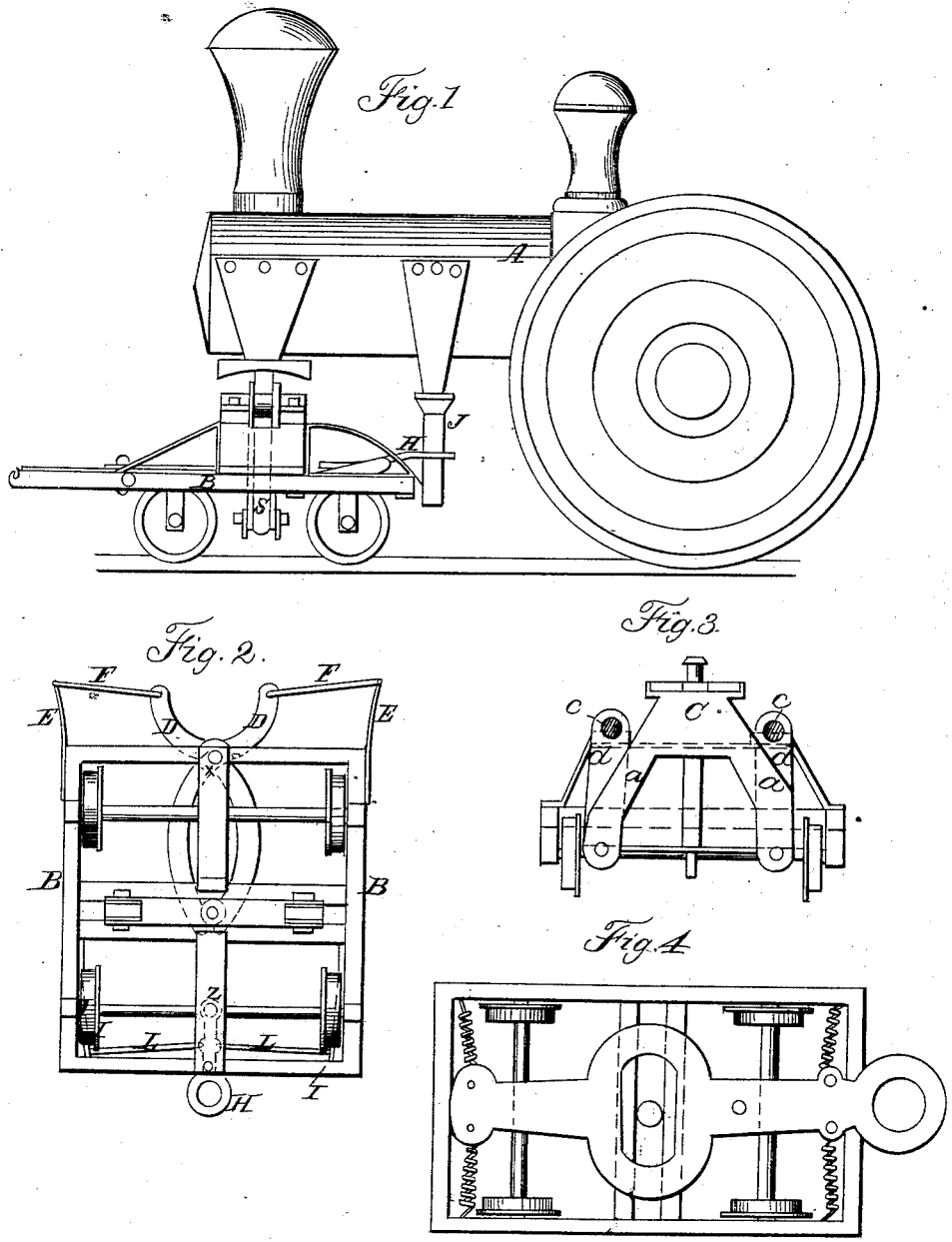
Witnesses:
C. M. Alexander
M. M. Dow
Inventor:
Daniel R. Pratt

UNITED STATES PATENT OFFICE.

DANIEL R. PRATT, OF WORCESTER, MASSACHUSETTS.

TRUCK FOR LOCOMOTIVES.

Specification of Letters Patent No. 30,421, dated October 16, 1860.

*To all whom it may concern:*

Be it known that I, DANIEL R. PRATT, of Worcester, in the State of Massachusetts, have invented certain new and useful Improvements in Locomotive Pilot-Trucks; and I do hereby declare that the following is a full, clear, and exact description of the same, reference being had to the accompanying drawings and to the letters of reference marked thereon.

The nature of my invention consists in constructing and arranging the several parts of my truck substantially in the manner hereinafter described.

In the annexed drawings, Figure 1 represents a side elevation. Fig. 2 is a bottom view of the truck. Fig. 3 is a section of the truck. Fig. 4 is bottom view of truck with a different plan.

In the figures, A, represents a locomotive, which is constructed in any of the known ways.

B, represents a truck upon which the forward end of the locomotive rests, said truck being constructed in the usual manner with four wheels.

C, represents a metallic bed or support which is placed about center way of the truck and which sustains the forward portion of the locomotive. One portion of the bed plate is secured to this bed, while the other portion of the bed plate is secured to the under side of the locomotive. This bed C, is provided with two arms a, a, which extend down beneath the truck, and which connect with the short shafts c, c, by means of connecting rods or bars d, d. The connecting rods or bars d, d, are firmly attached to the shafts c, c, and the weight of the forward part of the locomotive is transferred to the shafts (c) from the bed C, by means of the connecting rods, d, d. The connecting rods being pivoted to the bed C, it will be seen that the bed may have a backward and forward sidewise motion.

I, I, represent springs which are attached to the truck as represented in Fig. 2, and which are connected to a lever H, by means of rods L, L. The lever H, is pivoted at one end to a portion of the truck, so that its other or outer end will vibrate or move sidewise as will be seen. A bolt or pin passes down from the locomotive back of the king bolt and enters an opening in the end of the lever H.

S, represents the center pin or king bolt, which is attached to the locomotive, (or which may be attached to the bed) which in this case passes down through the bed, and moves sidewise with the bed.

D, D, represent two levers, which are secured to the truck, and, crossed, having their fulcrums at x. The inner ends of these levers press against the lower end of the king bolt, one on each side of said bolt as seen in Fig. 2.

E, E, represent springs attached to the truck as shown, and which connect with the levers, D, D, by means of rods F, F, as represented in Fig. 2.

When the bed C, and the bolt, S, sway or move sidewise the end of the bolt presses against the levers D, D, and moves them or one of them in the direction in which it is moving.

The levers (D,) may be arranged differently. A lever similar to the rear lever H, may be used which would act very much in the same manner.

When the engine is moving around a curve on the road, its wheels have a great tendency to bind, and rub, on account of the natural tendency of a moving body to keep in a straight line when once set in motion. This arrangement is intended to overcome this binding tendency, by turning or guiding the forward truck, or locomotive truck, so that it may turn and guide the locomotive. It will be readily seen from the parts which have been described that in passing around a curve, when the locomotive starts to move in a straight line, the bolt or pin J, acts upon the lever H, and the king bolt S, acts upon the levers D, D, thus giving direction to the truck from both ends.

In turning a curve, to the left, the locomotive operates the lever H to turn the rear of the truck to the right while it operates the levers D, to operate or turn the truck to the left, thus turning or guiding both ends of the truck at the same time. After turning the curve, the natural gravity of the locomotive, with the assistance of the springs, returns the forward end of the locomotive to its normal position, it having departed from that position, turning its end or nose to one side of the truck in moving around the curve.

There may be several changes made in my mode of effecting the object in view. I may use the mode described, and used, in Fig. 2, or I may dispense with the two levers D, D, and use only one lever, similar to the one used at the rear of the truck. Or I may use still another plan as seen in Fig. 4, where I use only one long lever, reaching from one end of the truck to the other, being connected to the truck at each end by coiled or other springs on each side and being directed and governed by means of the bolt J, at the back of the king bolt. The fulcrum of this lever may be forward or back of the king bolt, as may be desirable. The lever is made very much in the form represented in Fig. 4, being provided with an opening about its center through which the king bolt passes.

The lower ends of the arms $a$, $a$, spread a little beyond the center of gravity of the shafts, so that there may be a tendency of the engine or locomotive to right itself after turning a curve.

I obtain friction by making the journals of the shafts $c$, $c$, larger than the journal boxes. The box caps may be screwed down to make the necessary amount of friction.

Having thus fully described my invention, what I claim as new, and desire to secure by Letters Patent, is—

1. Attaching the locomotive to the truck by means of the king bolt and swaying bed C, said bed being hung upon the shafts $c$, $c$, by means of the connecting rods or bars $d$, $d$, substantially as and for the purpose herein specified.

2. The employment of the springs and levers used in connection with the truck as herein represented whereby the forward and rear ends of the truck are guided at the same time by the movement of the locomotive substantially as specified.

DANIEL R. PRATT.

Witnesses:
C. M. ALEXANDER,
M. M. DOW.